United States Patent [19]

Nerem et al.

[11] 4,168,050
[45] Sep. 18, 1979

[54] TILTABLE SWIVEL SEAT

[75] Inventors: Marvin E. Nerem, Forest City; Roger W. Denney, Garner, both of Iowa

[73] Assignee: Winnebago Industries, Inc., Forest City, Iowa

[21] Appl. No.: 829,237

[22] Filed: Aug. 31, 1977

[51] Int. Cl.² .............................................. F16M 13/00
[52] U.S. Cl. ..................................... 248/393; 248/397; 248/425; 248/430; 297/328; 297/349
[58] Field of Search ............... 248/371, 393, 397, 416, 248/418, 425, 429, 430, 424; 297/325–328, 344, 349

[56] References Cited

U.S. PATENT DOCUMENTS

| 1,902,282 | 3/1933 | Hultgren | 248/425 |
|---|---|---|---|
| 2,106,650 | 1/1938 | Owler | 248/418 |
| 2,312,030 | 2/1943 | Cramer et al. | 248/418 X |
| 2,429,017 | 10/1947 | De Rose | 248/394 |
| 2,721,604 | 10/1955 | Salvadore et al. | 248/425 |
| 2,726,907 | 12/1955 | Krauss | 248/425 X |
| 3,039,820 | 6/1962 | DaFoe | 248/430 X |
| 3,120,371 | 2/1964 | Dall | 248/397 |
| 3,220,688 | 11/1965 | Baermann | 248/384 |
| 3,362,746 | 1/1968 | Huyge | 297/344 X |
| 3,394,964 | 7/1968 | Humphries et al. | 297/240 |
| 3,572,817 | 3/1971 | Colauti et al. | 296/65 |
| 3,622,202 | 11/1971 | Brown | 297/344 |
| 3,659,895 | 5/1972 | Dresden | 296/65 R |
| 3,680,821 | 8/1972 | Barriere | 248/371 |
| 3,860,283 | 1/1975 | Colautti | 248/425 X |
| 3,873,054 | 3/1975 | McKee et al. | 248/418 X |
| 3,975,050 | 8/1976 | McKee | 248/371 X |
| 3,979,099 | 9/1976 | Strang | 248/425 X |

FOREIGN PATENT DOCUMENTS

| 2141116 | 3/1973 | Fed. Rep. of Germany | 297/328 |
|---|---|---|---|
| 2255122 | 5/1974 | Fed. Rep. of Germany | 248/393 |
| 162610 | 3/1958 | Sweden | 248/429 |
| 518062 | 2/1940 | United Kingdom | 297/328 |

Primary Examiner—Lawrence J. Staab
Attorney, Agent, or Firm—Burd, Braddock & Bartz

[57] ABSTRACT

A seat supported on a fixed pedestal with a mount assembly operable to permit rotational movement of the seat about an upright axis, longitudinal fore and aft movement and transverse tilt movement of the seat. The mount assembly has a base member pivotally connected to the pedestal for movement about an upright axis. A first lock pin locks the base member in a fixed forward position. When the lock pin is released the base member can rotate about a generally horizontal axis. A pair of longitudinally located track assemblies are pivotally connected to the rear portion of the base member. The forward portions of the track assemblies are held in selected elevated positions with releasable locking arms thereby changing the tilt position of the seat. The track assemblies also have movable carriages that can be locked in selected longitudinal positions to adjust the fore and aft position of the seat.

45 Claims, 8 Drawing Figures

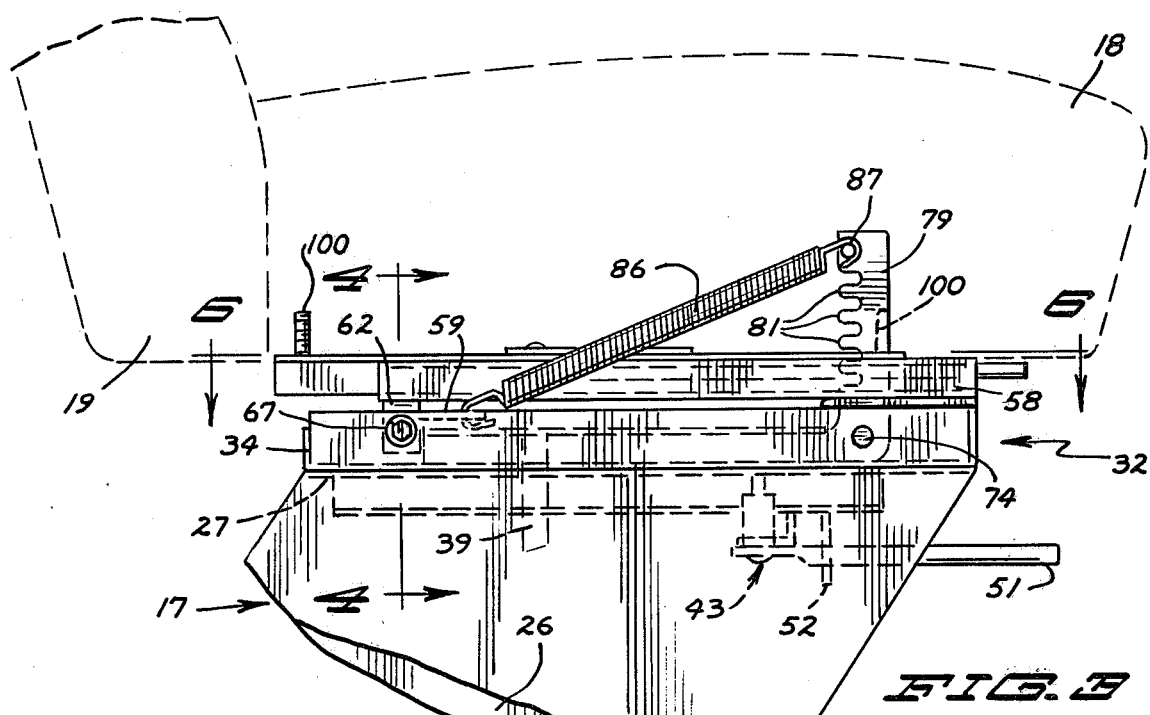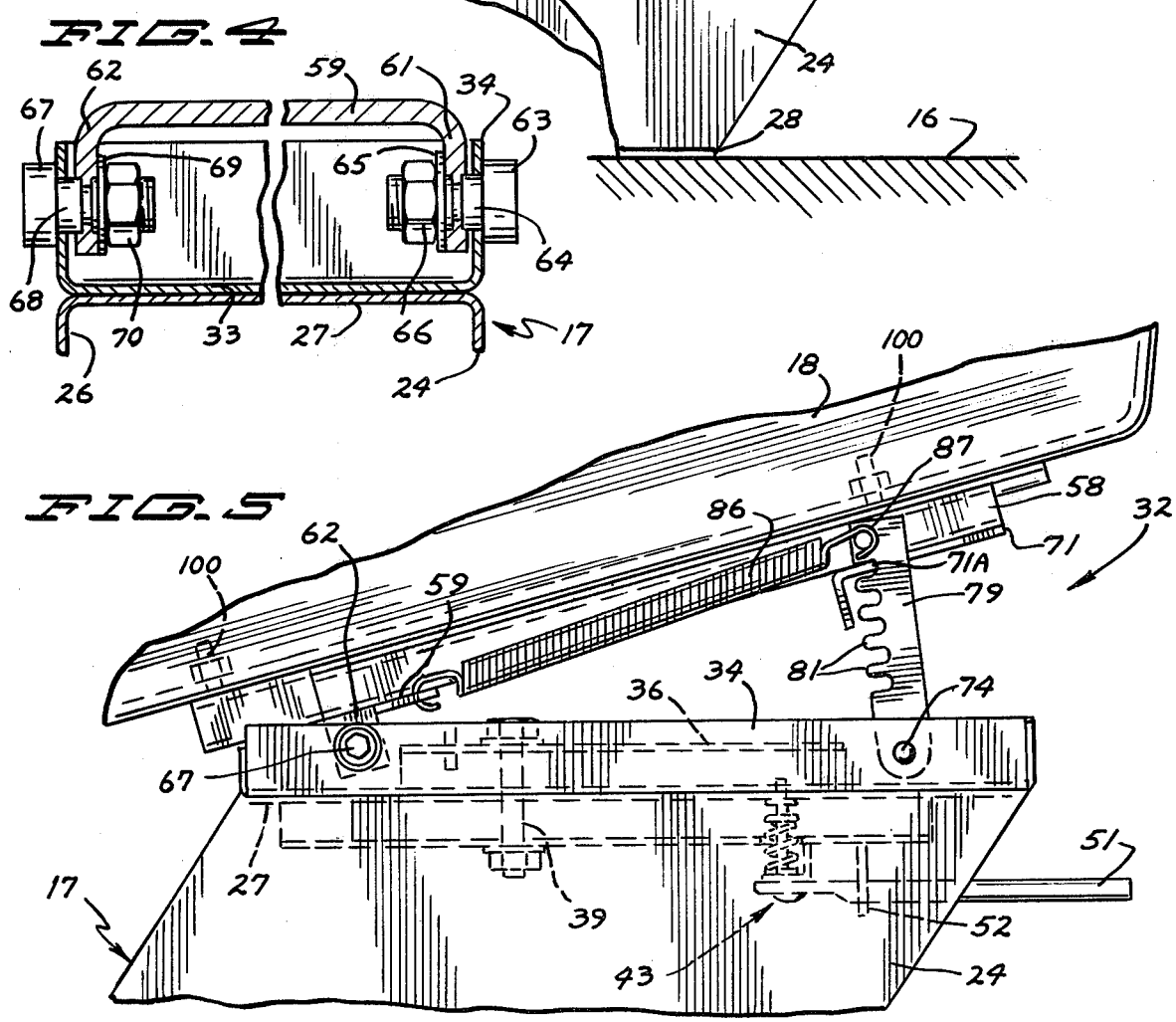

TILTABLE SWIVEL SEAT

BACKGROUND OF INVENTION

Motor vehicles, as motor homes, vans and trucks have driver's and passenger seats that are adjustable into several positions to accommodate the driver and the passengers of the vehicle. The seats are movably mounted on support structure attached to the floor and frame of the vehicle. The seats are usually adjusted in the fore and aft positions to properly position the driver of the vehicle relative to the steering wheel. Some seat structures also permit the back rest to be tilted about a generally transverse axis. Examples of adjustable seats are shown in the following patents:

U.S. Pat. No. 2,429,017 De Rose
U.S. Pat. No. 3,220,688 Baermann
U.S. Pat. No. 3,394,964 Humphries et al
U.S. Pat. No. 3,572,817 Colauti et al
U.S. Pat. No. 3,622,202 Brown
U.S. Pat. No. 3,659,895 Dresden
U.S. Pat. No. 3,680,821 Barriere.

SUMMARY OF INVENTION

The invention is directed to a seat unit having a mount assembly for mounting the seat on a fixed support so that the seat can be pivoted about a generally upright axis, moved to a fore and aft position, and tilted about a generally horizontal transverse axis. An upright pivot means pivotally connects the mount assembly to the support in a manner which allows the mount assembly and the seat to rotate about an upright axis. A first locking means mounted on the support is engageable with the mount assembly to hold the mount assembly and seat thereon in a fixed forward position. The first locking means can be released thereby permitting rotation of the mount assembly and seat about the upright axis. When the seat is rotated back to the forward position the first locking means automatically locks the seat in this position without manual manipulation.

The mount assembly further includes a base member and rail means secured to the seat. Pivot means pivotally connect the rail means to the base member for movement about a transverse horizontal axis to allow the seat to be moved to a selected tilt position. Second locking means mounted on the base member operate to releasably hold the rail means in a selected angular position. The second locking means include a pair of upright arms secured to a control rod. The control rod is rotatably mounted on a base member and is operated by the occupant of the seat to release the arms from locking engagement with the rail means. Biasing means acting on the arms urge the arms to a locking position. The rail means include a pair of rail assemblies. Each rail assembly has a movable carriage which is secured to the frame structure of the seat. The carriages are movable in a longitudinal fore and aft position thereby changing the fore and aft position of the seat. A third lock means mounted on a carriage is operable to hold the carriage in a selected position. The third lock means can be released by the occupant of the seat thereby allowing the seat occupant to adjust the fore and aft position of the seat. Each of the seat positions can be individually controlled by the occupant of the seat independently of the position of the seat.

The mount assembly is a compact and versatile structure that can be mounted on different types of fixed supports and used with different types of seats. The mount assembly is located under the seat and the controls for the first, second and third locking means are readily accessible by the occupant of the seat. The mount assembly is sturdy in construction and reliable in use. These and other advantages of the mount assembly and seat unit of the invention are embodied in the following detailed description of the invention.

IN THE DRAWINGS

FIG. 3 is an enlarged side elevational view of the mount assembly and support of the seat unit of FIG. 1;

FIG. 4 is an enlarged for shortened sectional view taken along the line 4—4 of FIG. 3;

FIG. 5 is a fragmentary side elevational view similar to FIG. 3 showing the seat in its raised or back tilted position;

DESCRIPTION OF PREFERRED EMBODIMENT

Figure 1:
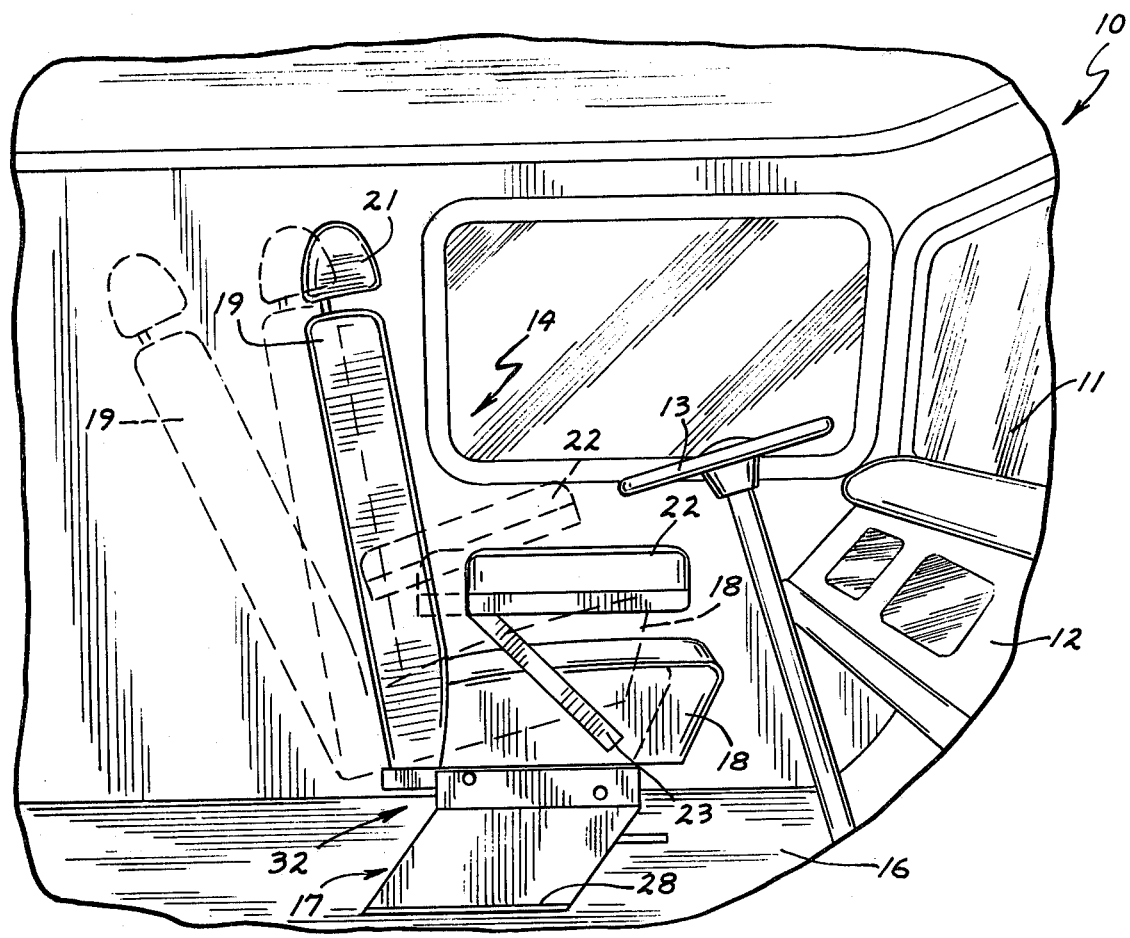
FIG. 1 is a side elevational view of the seat unit of the invention in a driver's compartment of a vehicle as a motor home.

Referring to FIG. 1, there is shown a vehicle indicated generally at 10, such as a motor home, a van, a panel truck, and the like. Vehicle 10 has a front windshield 11 located above a dash board 12. Extended upwardly from behind dash board 12 is a steering wheel 13. A driver's seat unit indicated generally at 14 is located rearwardly of steering wheel 13 so that it can be utilized by the driver of the vehicle to steer the vehicle. Seat unit 14 is mounted on floor 16 with an upright support or pedestal indicated generally at 17. Seat unit 14 has a generally horizontal seat 18 and an upright back rest 19. A head rest 21 is mounted on the top of back rest 19. An arm rest 22 is located adjacent to the right side of seat 18. An upwardly directed support 23 connects arm rest 22 to the frame structure of seat 18. Other types of arm rests, such as the arm rests disclosed by Krien in U.S. Pat. No. 3,544,163 can be used with seat unit 14.

As shown in FIG. 3, support 17 has a pair of upright flat side walls 24 and 26 and a horizontal top wall or platform 27. Side walls 24 and 26 and top wall 27 are made from a single piece of sheet metal formed into a generally inverted U-shaped base. Side walls 24 and 26 have a generally trapezoidal shape and extend upwardly and forwardly from the floor 16. Outwardly directed longitudinal flanges 28 and 29 secured to the bottom edges of side walls 24 and 26 support the base of floor 16. A plurality of fasteners 31, as bolts, are extended through holes in the flanges 28 and 29 to firmly secure the base to floor 16.

Figure 2:
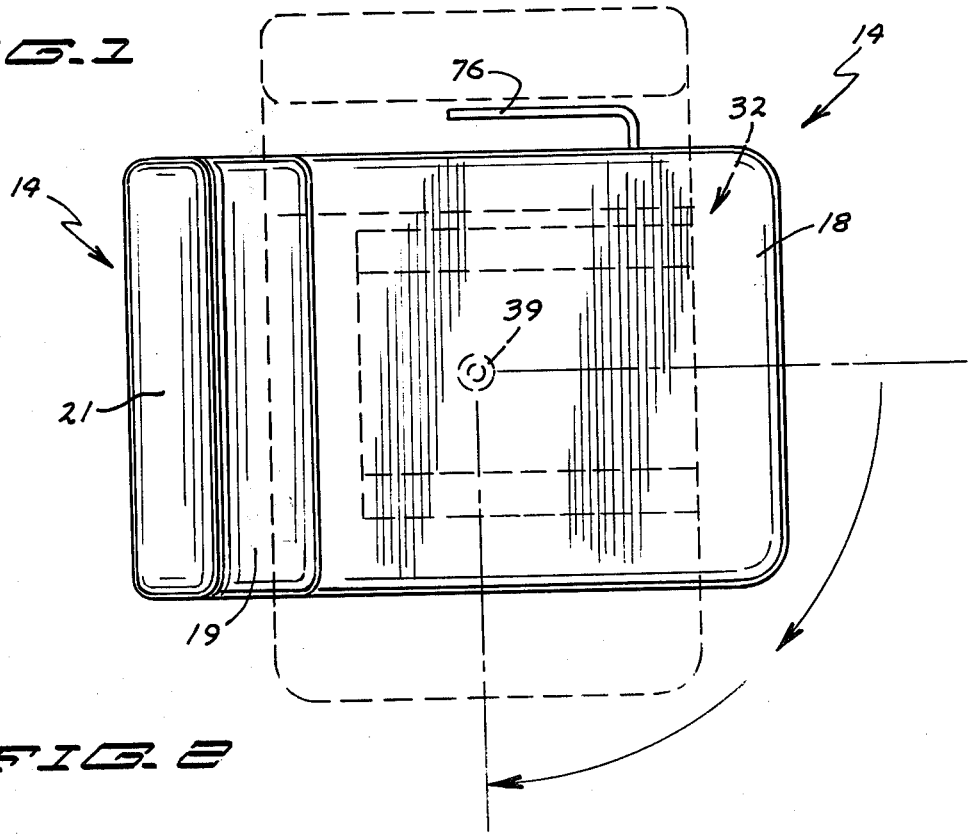
FIG. 2 is a top plan view of the seat of FIG. 1 showing a rotated position of the seat in broken lines.

A mount assembly indicated generally at 32 supports seat unit 14 on support 17. Mount assembly 32 is selectively operable to permit the seat unit 14 to be moved into fore and aft seat positions as shown in FIG. 1, to change the back angle of the seat unit, and allow the seat unit to rotate about an upright axis whereby seat unit 14 can be angularly moved from a forwardly directed position. A 90 degree rotation of seat unit 14 is illustrated in FIG. 2. Seat unit 14 is free to rotate in either direction as it is only locked in the forward driving position. Seat unit 14 can rotate 180 degrees so it faces the rear or recreational compartment of the motor home.

Figure 6:
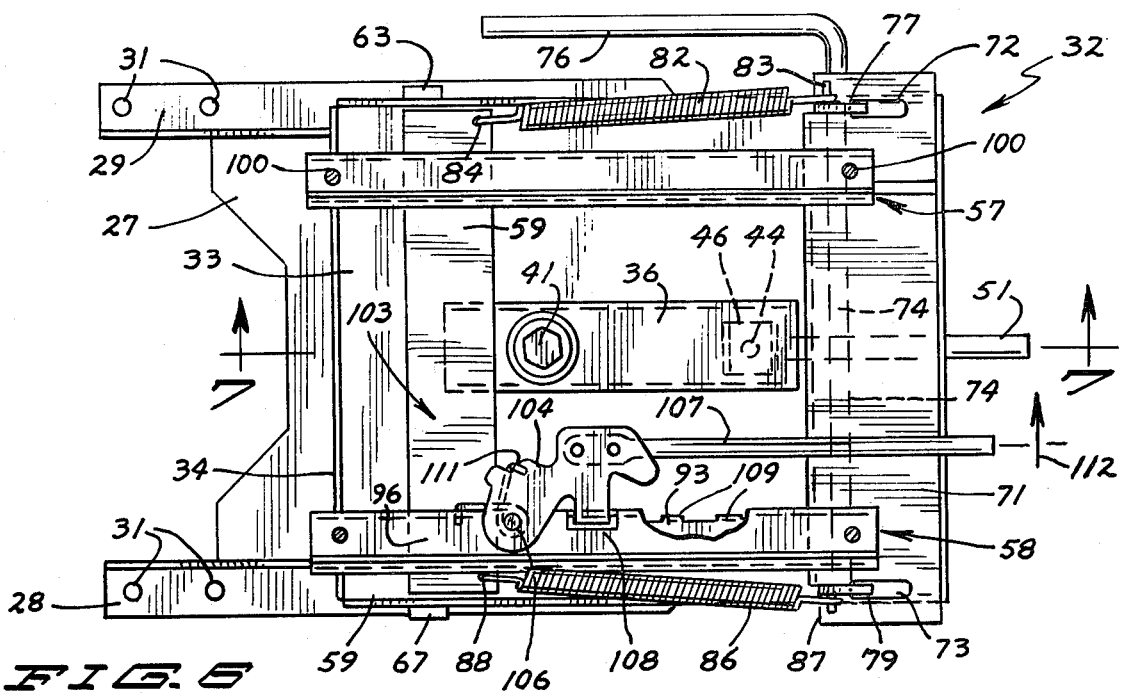
FIG. 6 is a sectional view taken along the line 6—6 of FIG. 3.
Figure 7:
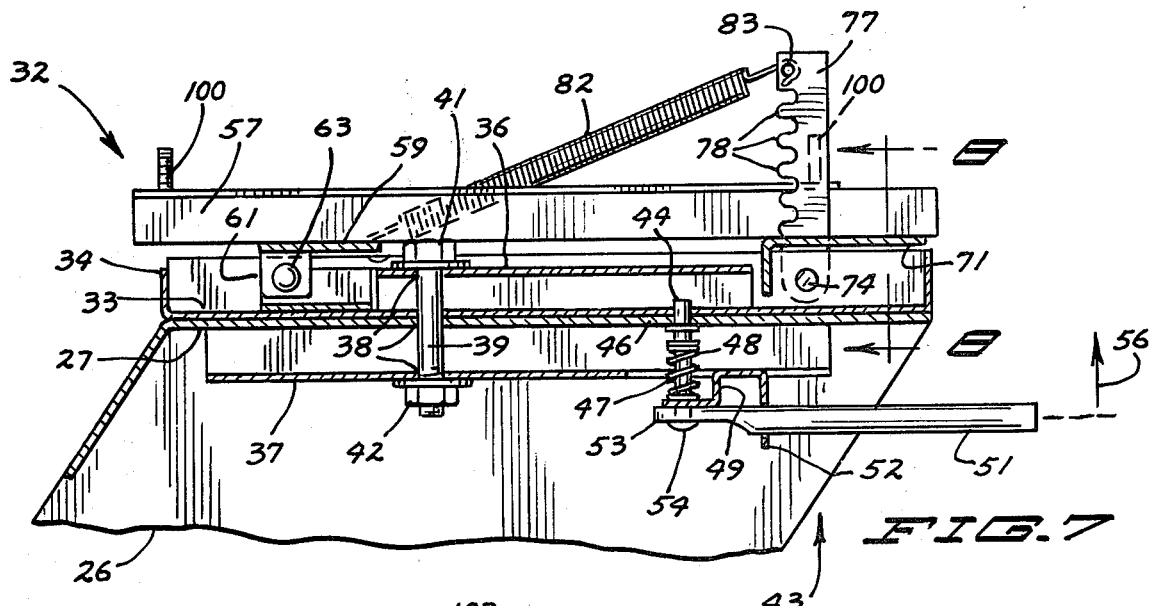
FIG. 7 is a sectional view taken along the line 7—7 of FIG. 6.

Mount assembly 32 has a pan-shaped base member 33 having upright sides and ends 34. Base member 33 is located in face to face contact with the upper surface of platform 27. As shown in FIGS. 6 and 7, a longitudinal inverted channel or U-shaped member 36 is secured to the top of base member 33 along the center line thereof. A channel or U-shaped member 37 secured to the bottom of platform 27 is in longitudinal alignment with channel 36. Channels 36 and 37, platform 27, and base member 33 have vertically aligned holes 38. An upright swivel or king pin 39 extends through holes 38 to secure the pan or base member 33 to the top of platform 27. Pin 39 permits base member 33 to rotate about in upright or vertical axis. Pin 39 has a top head 41 engaging a washer located on top of channel 36. A nut 42 is threaded on the lower end of pin 39.

Base member 33 is held in a non-rotated forward position by a first locking unit indicated generally at 43. Locking unit 43 has an upright movable locking pin 44. The upper end of pin 44 projects through holes 46 in platform 44 and base member 33 to prevent the rotation of base member 33 about king pin 39. A spring 47 concentrically positioned about locking pin 44 biases pin 44 to its up locking position. The upper end of spring 47 bears against a collar 48 secured to the midportion of pin 44 below platform 27. The lower end of spring 47 rests on an L-shaped bracket 49. Bracket 49 is secured to channel 37. An elongated forwardly directed control bar 51 is used to extract pin 44 from holes 46. Control bar projects through a downwardly directed fulcrum member 52 secured to the forward end of channel 37. Fulcrum member 52 has a hole for accommodating a portion of control bar 51. Control bar 52 has a flattened rear end 53 containing a hole accommodating the lower portion of pin 44. The lower end of pin 44 has a head 54, which retains control bar 51 in the assembled relation with pin 44. Control bar 51 is raised or pivoted in an upward direction as indicated by the arrow 56. This retracts pin 44 from 46 in base member 33. When pin 44 is retracted from base member 33 the base member is free to pivot about the upright axis of king pin 39. When base member 33 is rotated back to the front position, pin 44 automatically moves back into the hole 46 in the base member to lock the base member on the platform 27.

Mount assembly 32 further includes a pair of longitudinal track assemblies 57 and 58. Track assemblies 57 and 58 are laterally spaced from each other and are attached to a rear cross plate 59 and a forward cross plate 71. As shown in FIG. 4, cross plate 59 has downwardly directed ends or ears 61 and 62. Ears 61 and 62 are located adjacent to the inside ends of side flanges 34 of the rear portion of pan member 33. A first pivot bolt 63 pivotally connects ear 61 to flange 34. Bolt 63 has an enlarged shoulder or body 64 projected through a hole in flange 34. A washer 65 having a large shoulder projects into a complimentary hole in ear 61. A nut 66 threaded onto the inner end of bolt 63 holds the bolt in assembled relation with ear 61. A second pivot bolt 67 transversely aligned with the bolt 63 pivotally mounts ear 62 on the opposite flange 34 of base member 33. Bolt 67 has an enlarged shoulder or body 68 projected through a hole in the flange 34 and into a hole in ear 62. A washer 69 located adjacent the inside of ear 62 has an enlarged shoulder that fits into a recess in the ear 62. A nut 70 threaded onto the inner end of bolt 67 holds the bolt in assembled relation with the ear 62. The bolts 63 and 67 function in concert to permit the track assemblies 57 and 58 to pivot about the general transverse horizontal axis of the bolts 63 and 67.

Front transverse plate 71 is secured to the bottom sides of track assemblies 57 and 58. Referring to FIG. 6, plate 71 has a first longitudinal slot 72 in the right end of the plate. A second longitudinal slot 73 is located in the left end of the plate. Transversely located below the plate 71 is a transverse rod 74. Rod 74 has opposite ends rotatably mounted in holes in side flanges 34 of base member 33. The left end of rod 34 has a rearwardly directed control handle 76 that is manipulated by the operator of the vehicle to rotate rod 74. Handle 76 can be secured to the right end of rod 74.

A first upright arm 77 is secured to rod 74 and projects upwardly through slot 72. Arm 77 has a plurality of rearwardly directed teeth 78. As shown in FIG. 7, teeth 78 are vertically spaced from each other and are adapted to bite into a rearward section of plate 71. A second upright arm 79 is secured to the opposite end of rod 74. Rod 79 has a plurality of rearwardly directed teeth 81. As shown in FIG. 5, teeth 81 are vertically spaced from each other and are adapted to accommodate a portion of the plate 71 to hold the seat unit 14 at a selected angle.

A pair of springs 82 and 86 function to bias the arms 77 and 79 in rearward locking positions. Spring 82 has a forward hook end mounted on a pin 83 secured to the upper end of arm 77. The rear end of spring 82 has a hook end projected through a hole 84 in plate 59. The second spring 86 has a forward hook end secured to a pin 87. Pin 87 is attached to the upper end of arm 79. The rear end of spring 86 has a hook end projected through a hole 88 in rear plate 69.

In use handle 76 is pulled by the operator of the vehicle in an up position against the biasing force of springs 82 and 86. The upward movement of handle 76 rotates rod 74 in a clockwise direction. This moves the arms 77 and 78 in a forward direction or to release positions. When the arms 77 and 79 are in their release positions, the seat unit 14 can be pivoted about the pivot bolts 63 and 67 and thereby change the back angle of the seat. When the operator releases the handle 76, springs 82 and 86 bias arms 77 and 79 in a rearward locked position. The teeth 78 and 81 engage portions 71A of the plate 71 thereby fixing the angular position of the seat unit 14.

Figure 8:
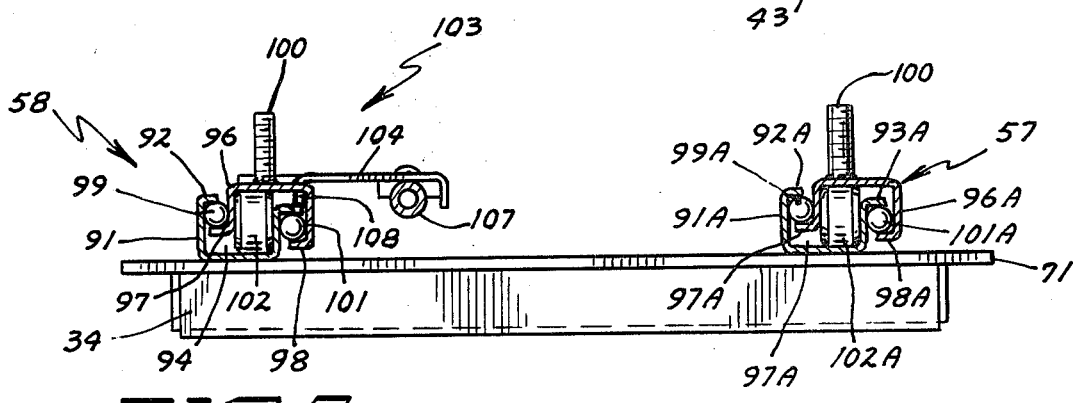
FIG. 8 is a sectional view taken along the line 8—8 of FIG. 7.

Track assemblies 57 and 58 are identical in structure and are shown in detail in FIG. 8. Track assembly 58 has an elongated generally U-shaped rail 91 secured to the plates 59 and 71. Rail 91 has a pair of inwardly directed top flanges 92 and 93 extended longitudinally along the length of the rail. Rail 91 has a longitudinal groove or guideway 94 for accommodating a carriage 96. Carriage 96 is a generally inverted U-shaped member having outwardly directed bottom flanges 97 and 98. Flange 97 is located below flange 92 and retains a plurality of roller bearings 99. Flange 98 is located below flange 93. A plurality of roller bearings 101 are located between flanges 93 and 98. A plurality of upright rollers or wheels 102 are located between the bases of the rail 91 and carriage 96. The identical parts of track assembly 57 have the same reference numerals with the suffix "A". Carriages 96 and 96A can move longitudinally along rails 91 and 91A to adjust the in and out position of seat unit 14.

The carriages 96 and 96A are secured to the frame structure of seat 18 with the upright bolts 100. Suitable nuts threaded on bolts 100 are used to securely fasten the frame of seat 18 to the carriages. The ball bearings 99 and 101, along with the rollers 102, 102A allow the seat unit to be moved fore and aft when an operator is seated on the seat 18.

The longitudinal position of seat unit 14 is controlled by a releasable lock mechanism indicated generally at 103 in FIG. 6. Lock mechanism 103 has a movable body 104. A portion of body 104 is pivoted to top of carriage 96 with a pivot pin 107. A forwardly directed handle or rod 107 is secured to the body 104. The forward end of handle 107 is located below the front of seat unit 18 where it is accessible to the operator of the vehicle. Body 104 has a downwardly directed tab or ear 108. Ear 108 cooperates with a plurality of teeth 109 on the flange 93 of the fixed rail 91. A spring 111 located around pivot pin 106 and engageable with body 104 biases the body in a clockwise direction to urge the ear 108 to the locked position. Spring 111 can be a coil spring connected to body 104 and carriage 96 to bias the body to the lock position. The lock mechanism 103 is released by moving the handle 107 in a counterclockwise direction, as indicated by arrow 112. This moves ear 108 from engaging relationship with teeth 109. The seat can then be moved fore and aft to a desired position.

In use, seat unit 14 is normally in the forward locked position as shown in FIGS. 1 and 2. The mount assembly 32 is retained in the forward position by the first locked unit 43. As shown in FIG. 7, the locked pin 44 projects through the holes 46 to hold the base member 33 in a fixed forward position.

Lock unit 43 can be released by pulling the control bar 51 in an upward direction to extract block pin 44 from the hole 46. This allows the base member 33 to pivot about the axis of the king pin 39. The bottom of base member 32 is in flat sliding contact with the top of platform 43 thereby stabilizing the mount assembly on the pedestal 17. Seat unit 14 is free to swivel or angularly move to the right or left, as shown in broken lines in FIG. 2. As soon as the seat unit 14 is returned to the forward position, locked pin 44 automatically is biased upwardly into the hole 46. This locks the seat unit in the forward position.

The tilt position of the seat unit 14 can be adjusted. This is accomplished by raising the handle 76. The upward movement of handle 76 rotates the lock arms 77 and 79 out of engagement with the plate portions 71A. The track assemblies 57 and 58 can then be rotated about the pivot axis of the pivot bolts 63 and 67. When the proper tilt angle is achieved, the holding force on handle 76 is released. The springs 82 and 86 bias the lock arms 77 and 78 in a rearward locking position. The springs 82 and 86 hold the lock arms 77 and 78 in their locked positions.

The fore and aft position of seat unit 14 is adjusted by releasing the releasable lock mechanism 103. This is achieved by moving the handle 107 in a counterclockwise direction to release ear 108 from the teeth 109. When the proper fore and aft position has been attained, the force on handle 107 is released. Spring 111 will bias the ear 108 into locking engagement with the teeth 109. This fixes the longitudinal position of the seat unit 14.

While there has been shown and described the preferred embodiment of the seat unit and mount assembly connecting the seat unit on a pedestal, it is understood that changes in the seat unit, track assemblies, locking mechanisms, may be made by those skilled in the art without departing from the invention. The invention is defined in the following claims.

The embodiments of the invention in which an exclusive property or privilege is claimed are defined as follows:

1. A seat unit comprising:
    a fixed support,
    a seat,
    a mount assembly connected to the seat for mounting the seat on the support, said mount assembly including a base member, rail means secured to the seat, means pivotally mounting the rail means to the base member to allow the seat to tilt about a transverse horizontal axis, first lock means for holding the rail means in a selected angular position, a transverse plate secured to the end of the rail means remote from the means pivotally mounting the rail means to the base member, said plate having a pair of longitudinal slots, said first lock means including a pair of arms, one arm of said pair projected through a slot, each arm having a plurality of teeth engageable with the plate to fix the angular position of the rail means, means to bias the arms into engagement with the plate, means connected to the arms operable to move the arms out of engagement with the plate,
    upright pivot means pivotally connecting the mount assembly to the support allowing the mount assembly and seat to rotate about an upright axis,
    second lock means mounted on the support engageable with the mount assembly to hold the mount assembly and seat in a fixed position, said second lock means being releasable from the mount assembly thereby allowing rotation of the mount assembly and seat about said upright axis.

2. The seat unit of claim 1 wherein: the support has a top wall, and the mount assembly has a base member engageable with the top wall, said upright pivot means pivotally connecting the base member with the top wall, said second lock means being mounted on the top wall.

3. The seat unit of claim 2 wherein: the base member has a flat plate engageable with the top wall.

4. The seat unit of claim 2 including: a first member secured to the top of the base member and a second member secured to the bottom of the top wall, said upright pivot means extend through said first and second members.

5. The seat unit of claim 4 wherein: the first and second members are channel members.

6. The seat unit of claim 2 wherein: the second lock means comprises an upright pin, means to support the pin on the top wall, means to bias the pin into locking engagement with the base member, and means to move the pin to a release position.

7. The seat unit of claim 6 wherein: the means to move the pin to a release position is a control rod connected to the pin, and means to pivotally mount the control rod on the top wall.

8. The seat unit of claim 1 wherein: said rail means has at least one fixed elongated rail, movable means comprising a carriage mounted on the rail for movement relative to the rail, third lock means including a plurality of teeth on the fixed rail, a lock member engageable with the teeth of the third locking means, and means movably mounting the lock member on the carriage whereby the lock member can be released from the teeth of the third locking means to allow movement of the carriage relative to the rail.

9. The seat unit of claim 8 including: biasing means connected to the lock member and carriage for biasing the lock member into engagement with the teeth of the third locking means.

10. The seat unit of claim 8 including: an elongated handle secured to the lock member usable by the operator to move the lock member to its release position out of engagement with the teeth of the third locking means.

11. The seat unit of claim 1 wherein: said rail means includes a pair of rail assemblies, each rail assembly having a movable carriage for adjusting the fore and aft position of the seat, and third lock means for holding the carriage in a selected fixed position.

12. The seat unit of claim 1 wherein: the first lock means includes a control rod rotatably mounted on the base member, said pair of arms being fixed to the control rod, and biasing means connected to at least one of the arms for biasing the pair of arms to a locking position, said control rod being movable to release the pair of arms thereby allowing the rail means to pivot about said transverse horizontal axis.

13. The seat unit of claim 1 wherein: the means connected to the arms comprise a rod rotatably mounted on the base member.

14. The seat unit of claim 1 wherein: the means to bias the arms comprise springs connected to the arms.

15. A seat unit comprising:
a fixed support having a top wall,
a seat,
a mount assembly connected to the seat for mounting the seat on the support, means pivotally connecting the mount assembly to the support allowing the mount assembly and seat to rotate about an upright axis,
first lock means mounted on the support and engageable with the mount assembly to hold the mount assembly and seat in a fixed position, said first lock means being mounted on the top wall and releasable from the mount assembly thereby allowing rotation of the mount assembly and seat,
said mount assembly including a base member and rail means secured to the seat, said base member being located over and engageable with the top wall, said means pivotally connecting the mount assembly to the support comprising an upright pivot pin connecting the top wall and the base member, means pivotally connecting the rail means to the base member for movement about a transverse horizontal axis, second lock means mounted on the base member for releasably holding the rail means in a selected angular position, said second lock means including a control rod rotatably mounted on the base member, arm means fixed to the control rod, and biasing means connected to the arm means for biasing the arm means to a locking position, said control rod being movable to release the arm means thereby allowing the rail means to pivot about said transverse horizontal axis,
said rail means including a pair of rail assemblies secured to the seat allowing longitudinal fore and aft movement of the seat, each rail assembly having a movable carriage for adjusting the fore and aft position of the seat, and third lock means being operable to hold the carriages in a selected position.

16. The seat unit of claim 15 wherein: the base member has a flat plate engageable with the top wall.

17. The seat unit of claim 15 including: a first member secured to the top of the base member and a second member secured to the bottom of the top wall, said upright pivot means extended through said first and second members.

18. The seat unit of claim 17 wherein: the first and second members are channel members.

19. The seat unit of claim 15 wherein: the first lock means comprises an upright pin, means to support the pin on the top wall, means to bias the pin into locking engagement with the base member, and means to move the pin to a release position.

20. The seat unit of claim 19 wherein: the means to move the pin to a release position is a second control rod connected to the pin, and means to pivotally mount the second control rod on the top wall.

21. The seat unit of claim 18 wherein: said arm means includes a plurality of vertically spaced teeth allowing selected angular adjustment of the rail means.

22. The seat unit of claim 15 wherein: one of said rail assemblies has at least one fixed elongated rail, said carriage being mounted on the fixed rail for movement relative to the fixed rail, said third locking means including a plurality of teeth on the fixed rail, a lock member engageable with the teeth on the fixed rail, and means movably mounting the lock member on the carriage whereby the lock member can be released from the teeth on the fixed rail to allow movement of the carriage relative to the fixed rail.

23. The seat unit of claim 22 including: biasing means connected to the lock member and carriage for biasing the lock member into engagement with the teeth on the fixed rail.

24. The seat unit of claim 22 including: an elongated handle secured to the lock member usable by the operator to move the lock member to its release position out of engagement with the teeth on the fixed rail.

25. A mount assembly for mounting a seat on a support comprising:
a base member adapted to be pivotally connected to the support for movement about an upright axis,
first lock means for holding the base member in a selected position,
rail means adapted to be secured to the seat,
means pivotally connecting the rail means to the base member for movement about a transverse horizontal axis, a transverse plate secured to the end of the rail means remote from the means pivotally mounting the rail means to the base member, said plate having a pair of longitudinal slots,
second lock means mounted on the base member for releasably holding the rail means in a selected angular position, said second locking means including a pair of arms, one arm of said pair projected through a slot, each arm having a plurality of teeth engageable with the plate to fix the angular position of the rail means, means to bias the arms into engagement with the plate, means connected to the arms operable to move the arms out of engagement with the plate, said rail means including movable means adapted to be secured to the seat allowing longitudinal fore and aft movement of the seat, and third lock means for holding the movable means in a selected position.

26. The mount assembly of claim 25 including: a longitudinal member secured to the top of the base member.

27. The mount assembly of claim 25 wherein: the first lock means comprises an upright pin, means to bias the pin into locking engagement with the base member, and means to move the pin to a release position.

28. The mount assembly of claim 27 wherein: the means to move the pin is an elongated control rod connected to the pin.

29. The mount assembly of claim 25 wherein: said rail means includes a pair of rail assemblies, each rail assembly having a movable carriage for adjusting the fore and aft position of the seat, said third lock means holding the carriage in a selected fixed position.

30. The mount assembly of claim 25 wherein: the second lock means includes a control rod rotatably mounted on the base member, said pair of arms being fixed to the control rod, and biasing means connected to at least one of said arms for biasing the pair of arms to a locking position, said control rod being movable to release the pair of arms thereby allowing the rail means to pivot about said transverse horizontal axis.

31. The mount assembly of claim 25 wherein: the means connected to the arms comprise a rod rotatably mounted on the base member.

32. The mount assembly of claim 25 wherein: the means to bias the arms comprise springs connected to the arms.

33. The mount assembly of claim 25 wherein: said rail means has at least one fixed elongated rail, said movable means comprising a carriage mounted on the rail for movement relative to the rail, said third locking means including a plurality of teeth on the fixed rail, a lock member engageable with the teeth on the fixed rail, and means movably mounting the lock member on the carriage whereby the lock member can be released from the teeth on the fixed rail to allow movement of the carriage relative to the rail.

34. The mount assembly of claim 33 including: biasing means connected to the lock member and carriage for biasing the lock member into engagement with the teeth on the fixed rail.

35. The mount assembly of claim 33 including: an elongated handle secured to the lock member usable by the operator to move the lock member to its release position out of engagement with the teeth on the fixed rail.

36. A mount assembly and a fixed support having a top wall for supporting a seat comprising: means for connecting the seat to the mount assembly, means for pivotally connecting the mount assembly to the top wall of the support allowing the mount assembly and seat connected thereto to rotate about a generally upright axis, first lock means mountable on the top wall of the support and engageable with the mount assembly to hold the mount assembly and seat in a fixed position, said first lock means being releasable from the mount assembly thereby allowing rotation of the mount assembly and seat about said generally upright axis, said mount assembly including a base member and rail means adapted to be secured to the seat, said means for pivotally connecting the mount assembly to the support comprising an upright pivot pin connecting the top wall and the base member, means pivotally connecting the rail means to the base member for movement about a generally transverse horizontal axis, second lock means mounted on the base member for releasably holding the rail means in a selected angular position, said second lock means including a control rod rotatably mounted on the base member, arm means fixed to the control rod, and biasing means connected to the arm means for biasing the arm means to a locking position, said control rod being movable to release the arm means thereby allowing the rail means to pivot about said transverse horizontal axis, said rail means including a pair of rail assemblies adapted to be secured to the seat allowing longitudinal fore and aft movement of the seat, each rail assembly having a movable carriage for adjusting the fore and aft position of the seat, and third lock means being operable to hold the carriages in a selected position.

37. The mount assembly of claim 36 wherein: the base member has a flat plate engageable with the top wall of the support.

38. The mount assembly of claim 36 including: a first member secured to the top of the base member and a second member secured to the bottom of the top wall, said means for pivotally connecting the mount assembly to the top wall of the support comprising an upright pivot pin extended through said first and second members.

39. The mount assembly of claim 38 wherein: the first and second members are channel members.

40. The mount assembly of claim 36 wherein: the first lock means comprises an upright pin, means to support the pin on the top wall, means to bias the pin into locking engagement with the base member, and means to move the pin to a release position.

41. The mount assembly of claim 40 wherein: the means to move the pin to a release position is a second control rod connected to the pin, and means to pivotally mount the second control rod on the top wall.

42. The mount assembly of claim 31 wherein: said rail means has at least one fixed elongated rail, said movable means comprising a carriage mounted on the rail for movement relative to the rail, said third locking means including a plurality of teeth on the fixed rail, a lock member engageable with the teeth, and means movably mounting the lock member on the carriage whereby the lock member can be released from the teeth to allow movement of the carriage relative to the rail.

43. The mount assembly of claim 42 including: biasing means connected to the lock member and carriage for biasing the lock member into engagement with the teeth.

44. The mount assembly of claim 42 including: an elongated handle secured to the lock member useable by the operator to move the lock member to its release position out of engagement with the teeth.

45. The mount assembly of claim 36 wherein: said arm means includes a plurality of vertically spaced teeth allowing selected angular adjustment of the rail means.

* * * * *

UNITED STATES PATENT AND TRADEMARK OFFICE
CERTIFICATE OF CORRECTION

PATENT NO. : 4,168,050
DATED : September 18, 1979
INVENTOR(S) : Marvin E. Nerem et al It is certified that error appears in the above-identified patent and that said Letters Patent are hereby corrected as shown below:

Column 3, line 38, "Control bar 52" should be --Control bar 51--.

Signed and Sealed this

Twenty-second Day of January 1980

[SEAL]

Attest:

SIDNEY A. DIAMOND

*Attesting Officer*     *Commissioner of Patents and Trademarks*